United States Patent
Bertagna

(10) Patent No.: US 6,418,969 B1
(45) Date of Patent: Jul. 16, 2002

(54) IN-LINE THERMAL EXPANSION TANK

(75) Inventor: Peter J. Bertagna, Moultonboro, NH (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 09/708,743

(22) Filed: Nov. 8, 2000

(51) Int. Cl.$^7$ ................................................ F16L 55/04
(52) U.S. Cl. ........................................ 138/30; 138/28
(58) Field of Search ........................................ 138/28, 30

(56) References Cited

U.S. PATENT DOCUMENTS

| | | | |
|---|---|---|---|
| 2,760,518 A | * 8/1956 | Peet ............................ | 138/30 |
| 3,104,526 A | 9/1963 | Hirschfeld et al. | |
| 3,276,477 A | * 10/1966 | Bleasdale ..................... | 138/30 |
| 3,473,565 A | * 10/1969 | Blendermann ................ | 138/30 |
| 3,536,102 A | * 10/1970 | Altewitz et al. .............. | 138/30 |
| 3,625,242 A | * 12/1971 | Ostwald ....................... | 138/30 |
| 3,705,667 A | 12/1972 | Blaine et al. | |
| 3,744,527 A | * 7/1973 | Mercier ........................ | 138/30 |
| 3,809,291 A | 5/1974 | Purdy | |
| 3,847,307 A | 11/1974 | Hosek | |
| 3,862,708 A | 1/1975 | Waxlax | |
| 3,883,046 A | 5/1975 | Thompson et al. | |
| 3,931,834 A | 1/1976 | Caillet | |
| 3,961,725 A | 6/1976 | Clark | |
| 4,013,195 A | 3/1977 | Ferris | |
| 4,085,865 A | 4/1978 | Thompson et al. | |
| 4,448,217 A | 5/1984 | Mercier | |
| 4,598,737 A | * 7/1986 | Bentley ........................ | 138/30 |
| 4,745,945 A | 5/1988 | Miller | |
| 4,759,387 A | * 7/1988 | Arendt ......................... | 138/30 |
| 4,784,181 A | 11/1988 | Hilverdink | |
| 5,386,925 A | 2/1995 | Lane | |
| 5,584,316 A | 12/1996 | Lund | |
| 5,690,061 A | 11/1997 | Lopez | |
| 5,732,741 A | * 3/1998 | Shiery ......................... | 138/30 |
| 5,735,313 A | * 4/1998 | Jenski, Jr. et al. ............ | 138/30 |
| 5,823,007 A | 10/1998 | Chang | |
| 5,860,452 A | * 1/1999 | Ellis ............................ | 138/30 |
| 6,041,820 A | 3/2000 | Boehme | |
| 6,063,275 A | * 5/2000 | Traylor ........................ | 138/30 |

FOREIGN PATENT DOCUMENTS

DE 19711957 A1 3/1997

OTHER PUBLICATIONS

Brochure; "Watts Expansion Tanks"; Watts Regulator Co., Jan. 1998.
PCT/US01/46509 International Search Report, Feb. 2002.

* cited by examiner

Primary Examiner—James Hook
(74) Attorney, Agent, or Firm—Fish & Richardson P.C.

(57) ABSTRACT

An in-line expansion tank includes a sleeve defining a volume, a pipe positioned within the sleeve, and an annular flexible bladder disposed within the volume between the sleeve and the pipe. The pipe defines a fluid flow channel, an inlet at an upstream region of the pipe in fluid communication with the fluid flow channel, and an outlet at a downstream region of the pipe in fluid communication with the fluid flow channel. The bladder and the sleeve define an outer radial chamber therebetween. The chamber is pressurized during normal use and the bladder is configured to contact the pipe during operation at normal water pressure to minimize dead space between the bladder and the pipe. The tank includes a valve for pressurizing the chamber.

39 Claims, 6 Drawing Sheets

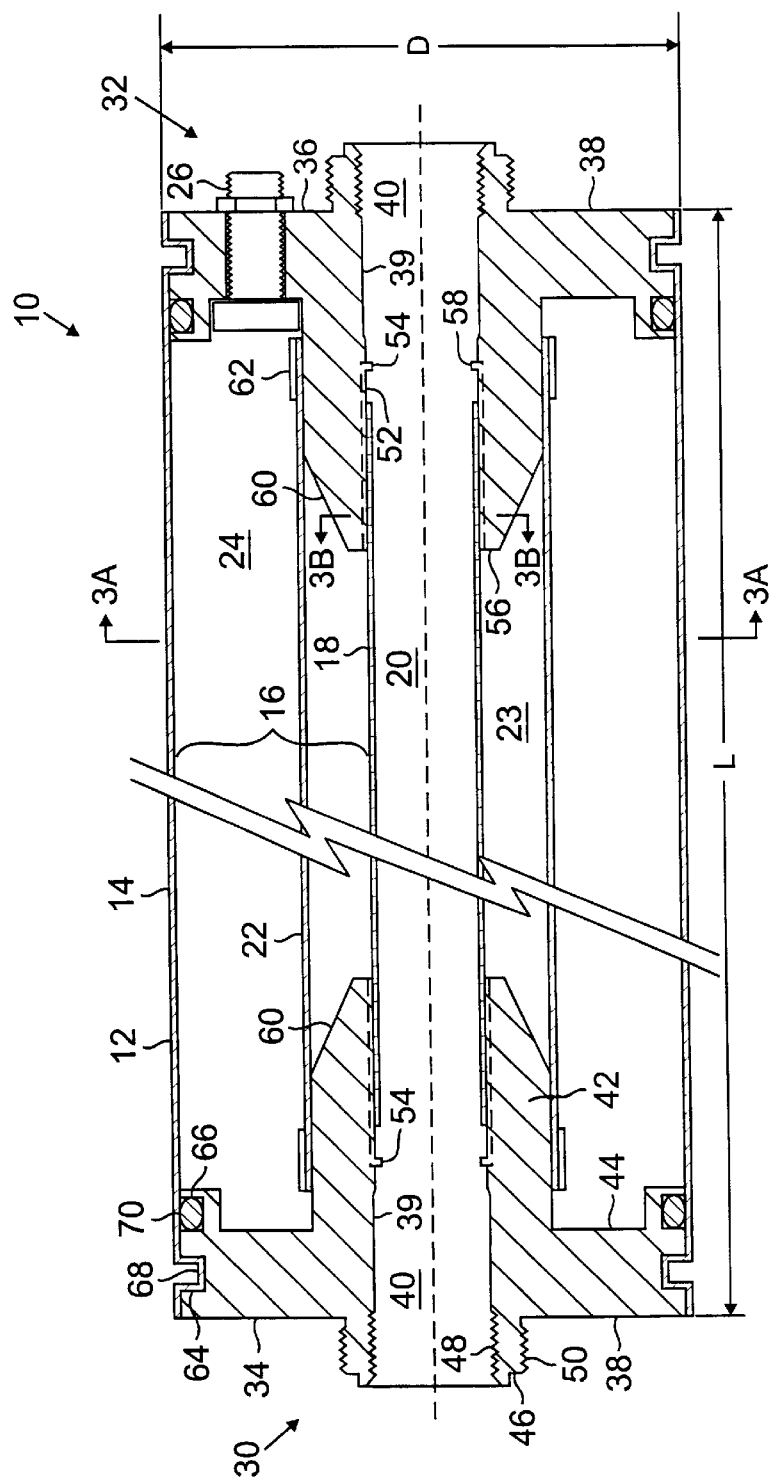
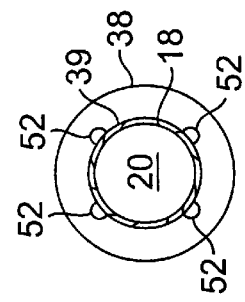
FIG. 3
FIG. 3B

IN-LINE THERMAL EXPANSION TANK

BACKGROUND

The invention relates to pressure expansion tanks for closed, hot water systems.

Thermal expansion of heated water may occur wherever water is heated in a closed system (when the water is isolated from the public water supply by a one-way valve: pressure reducing valve, backflow preventer, check valve, etc.). Expansion tanks are designed to absorb thermal expansion and to maintain a predetermined maximum pressure within the closed hot water system. Expansion tanks are used to prevent plumbing system and/or water heater damage and unnecessary relief valve discharge caused by excessive pressure from thermal expansion.

It is known to attach a drum-shaped expansion tank to a closed hot water system, e.g. in a home, to provide a volume for accommodating changes in pressure/volume (often due to changes in water temperature), to resist damage to hot water and heating system components. The tank may include a bladder that moves to vary the available volume in response to changes in pressure.

SUMMARY

According to the invention, an in-line expansion tank includes a sleeve defining a volume, a pipe positioned within the sleeve, and an annular flexible bladder disposed within the volume between the sleeve and the pipe. The pipe defines a fluid flow channel with an inlet at an upstream region of the pipe in fluid communication with the fluid flow channel, and an outlet at a downstream region of the pipe in fluid communication with the fluid flow channel. The bladder and the sleeve define an outer radial chamber therebetween.

Embodiments of this aspect of the invention may include one or more of the following features. The radial chamber is pressurized during normal use and the bladder is configured to contact the pipe at normal operating pressure to minimize dead space between the bladder and the pipe. The tank includes a valve for pressurizing the chamber.

In an illustrated embodiment, at the upstream region, the sleeve and bladder are attached to a first end cap, and at the downstream region, the sleeve and bladder are attached to a second end cap. The bladder is attached to the end caps by clamps. O-rings are positioned between the sleeve and the end caps. The first and second end caps each define an inwardly extending lip for retaining the pipe therebetween, and flow channels for allowing fluid communication between the fluid flow channel and a region between the pipe and the bladder.

The tank has an outer diameter of about four inches, and a length in the range of about 24 to 48 inches.

According to another aspect of the invention, a method of accommodating changes in pressure in a piping system includes coupling an inlet of an in-line expansion tank to a first piping system connection, and coupling an outlet of the tank to a second piping system connection in-line with the first connection. The tank includes an outer sleeve, an inner pipe, and an annular, flexible bladder therebetween. The method includes pressurizing a chamber defined between the outer sleeve and the bladder such that the bladder deforms toward an inner pipe under normal operating pressure and expands radially away from the pipe when the pressure in the piping system rises above the normal operating pressure.

The in-line expansion tank of the invention advantageously minimizes dead space between the pipe and the bladder that represents a potential for contamination. The tank is dimensioned to take up less horizontal space than convention drum-shaped expansion tanks.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a cross-sectional side view of the inline expansion tank shown at ambient pressure;

FIG. 3B is an end section view taken along lines 3B—3B in FIG. 3;

DETAILED DESCRIPTION

Figure 1:
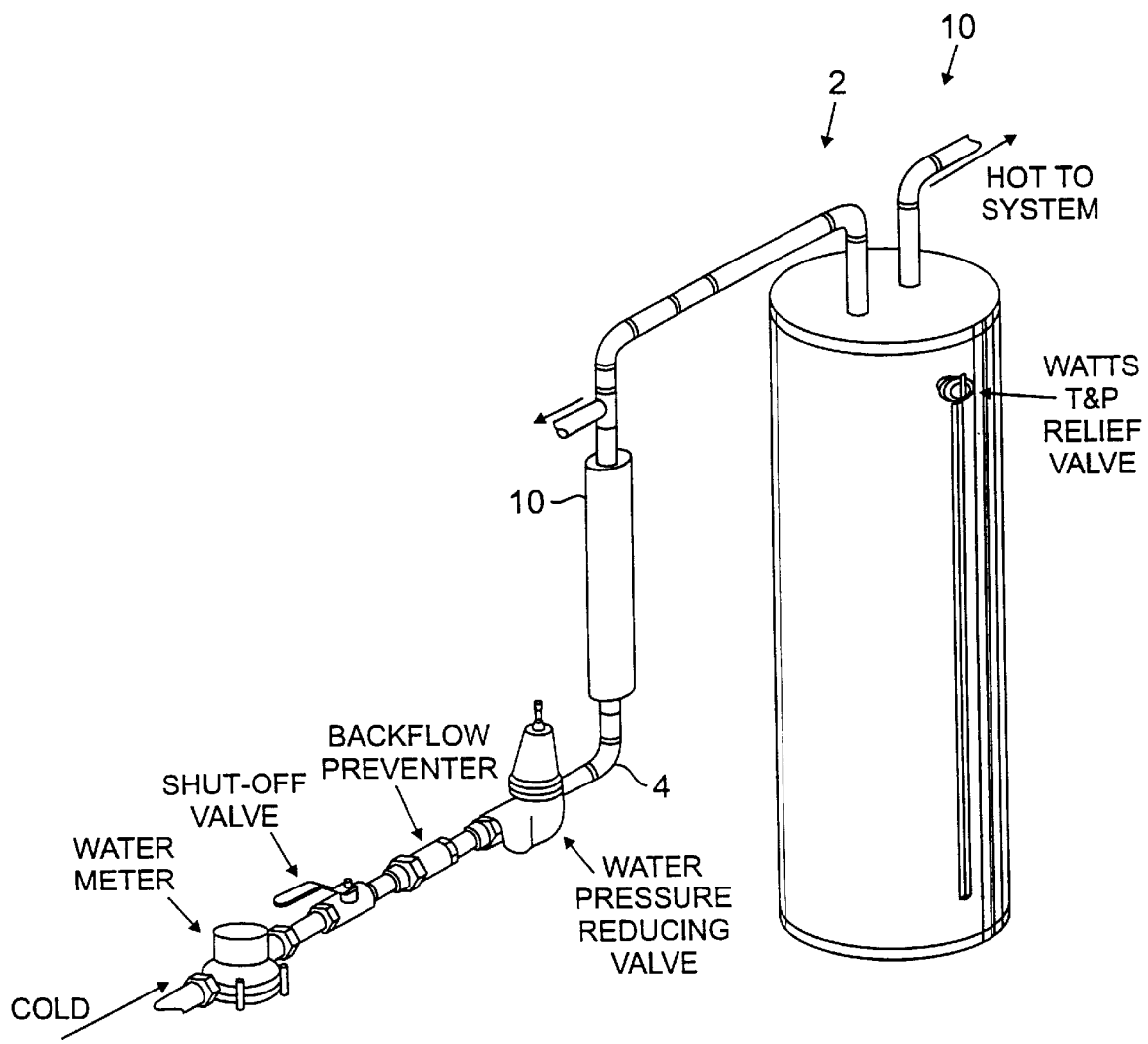
FIG. 1 is a diagrammatic representation of a hot water supply system including an inline expansion tank according to the invention.
Figure 2:
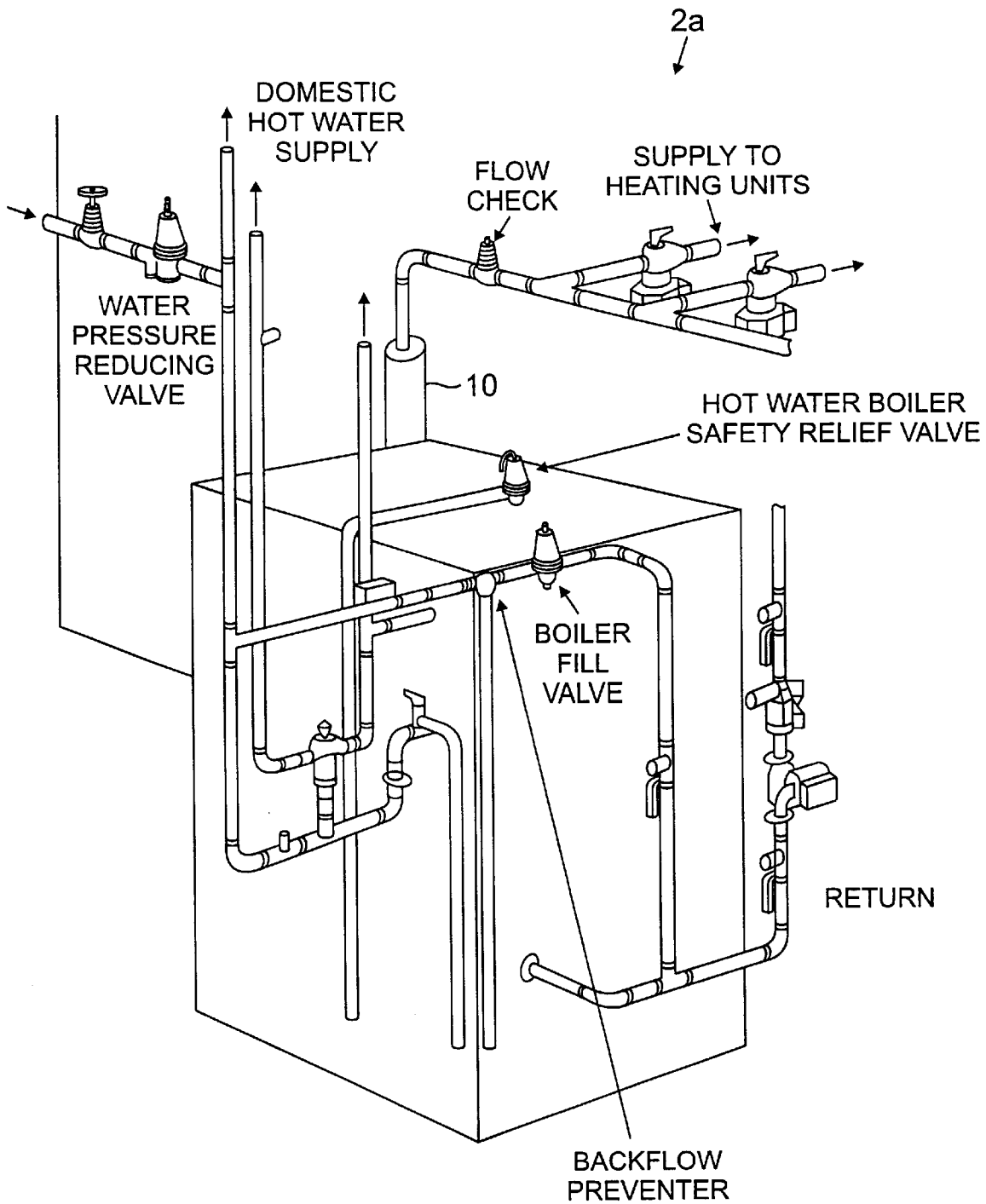
FIG. 2 is a diagrammatic representation of a hot water heating system including the inline expansion tank according to the invention.

Referring to FIGS. 1 and 2, a hot water supply system 2 (FIG. 1) and a hot water heating system 2a (FIG. 2) are shown incorporating an inline expansion tank 10 of the invention. In system 2, expansion tank 10 is installed across the cold water service pipe line 4 on the supply side of the water heater (or water storage tank). In system 2a, expansion tank 10 is installed on the domestic hot water (tankless) supply coil of a hot water heating boiler.

Figure 3A:
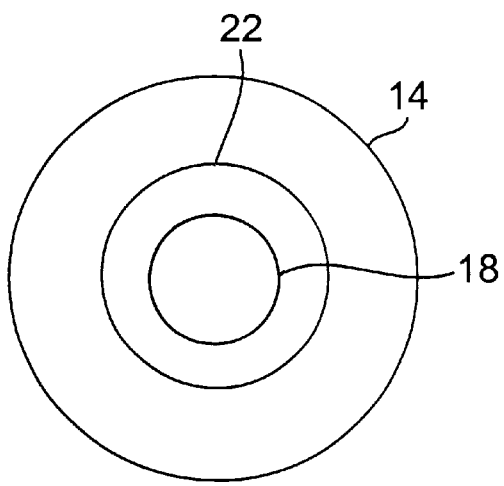
FIG. 3A is an end section view taken along lines 3A—3A in FIG. 3.

Referring to FIGS. 3 and 3A, inline expansion tank 10 has an elongated body 12 (e.g., having a length, L, in the range of about 24 to 48 inches, and a diameter, D, of about 4 inches) formed by a sleeve 14 defining a volume 16. Positioned within sleeve 14 is a pipe 18 defining an axial flow passage 20 through the sleeve. An annular flexible bladder 22 is disposed within the volume 16, between and (at ambient pressure) spaced from the sleeve 14 and the pipe 18 such that a region 23 is defined between bladder 22 and pipe 18. Bladder 22 and sleeve 14 define an annular, sealed region 24.

Tank 10 has an inlet end 30 and an outlet end 32. At inlet end 30, the concentrically arranged sleeve 14, bladder 22, and pipe 18 are mounted to an end cap 34. At outlet end 32, sleeve 14, bladder 22, and pipe 18 are mounted to an end cap 36. Each end cap 34, 36 includes a body 38 with an internal wall 39 defining a through bore 40 in fluid communication with passage 20. Pipe 18 is free floating within bores 40 of end caps 34, 36, and restrained between concentric, inwardly extending lips 54 defined by internal wall 39 of each end cap 34, 36. Referring also to FIG. 3B, to allow fluid communication between flow passage 20 and region 23, channels 52, e.g., four channels, are provided in internal wall 39. Channels 52 extend from an end 56 of body 38 to a side 58 of lip 54 facing away from pipe 18, as shown in dashed line in FIG. 3. Channels 52 cut through lip 54. Alternatively, to allow fluid communication between flow passage 20 and region 23 pipe 18 can be perforated.

Body 38 has a first annular section 42 that tapers inwardly at 60 to facilitate insertion of the end caps into bladder 22.

Bladder 22 is secured to section 42 of each end cap 34, 36 by a clamp 62. Body 38 has a second, larger diameter annular section 44 defining two grooves 64, 66. Sleeve 14 is attached to each end cap by crimping sleeve 14 within groove 64 at 68. Within groove 66 of each end cap 34, 36 is an o-ring seal 70. Body 38 has a third section 46 including internal threads 48 and external threads 50 for connecting expansion tank 10 to the piping system either with unions or threaded pipes. End cap 36 includes a valve 26, e.g., a tire inflation-type valve, for pressurizing region 24 to a pressure that matches the normal operating pressure of the system.

Figure 4A:
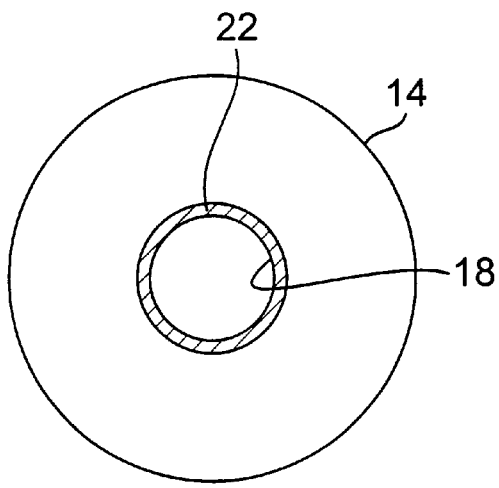
FIG. 4A is an end section view taken along lines 4A—4A in FIG. 4.
Figure 5A:
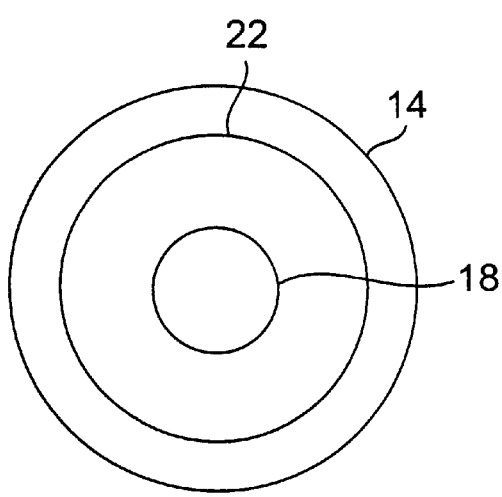
FIG. 5A is an end section view taken along lines 5A—5A in FIG. 5.
Figure 4:
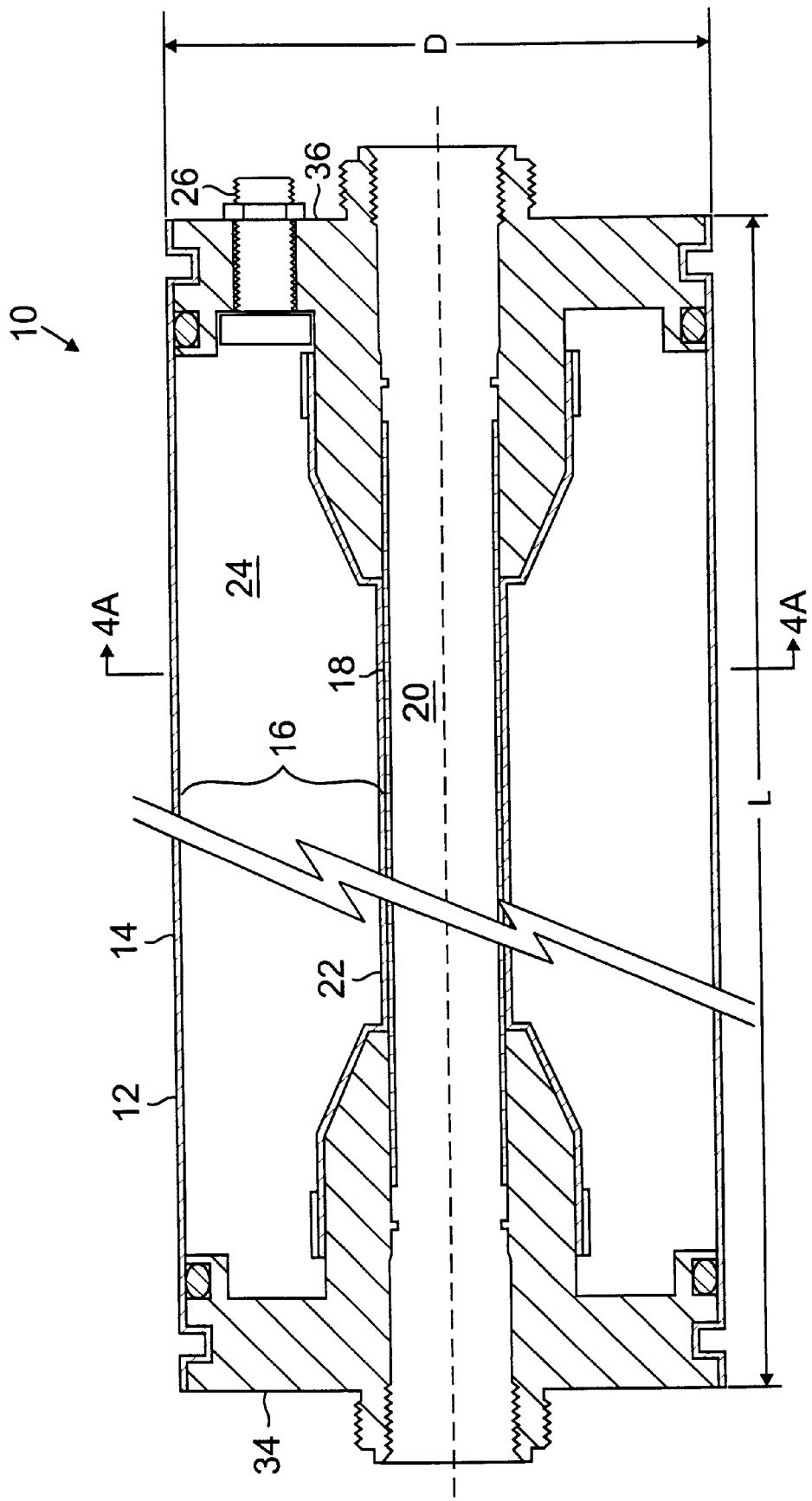
FIG. 4 is a cross-sectional side view of the inline expansion tank shown pressurized.
Figure 5:
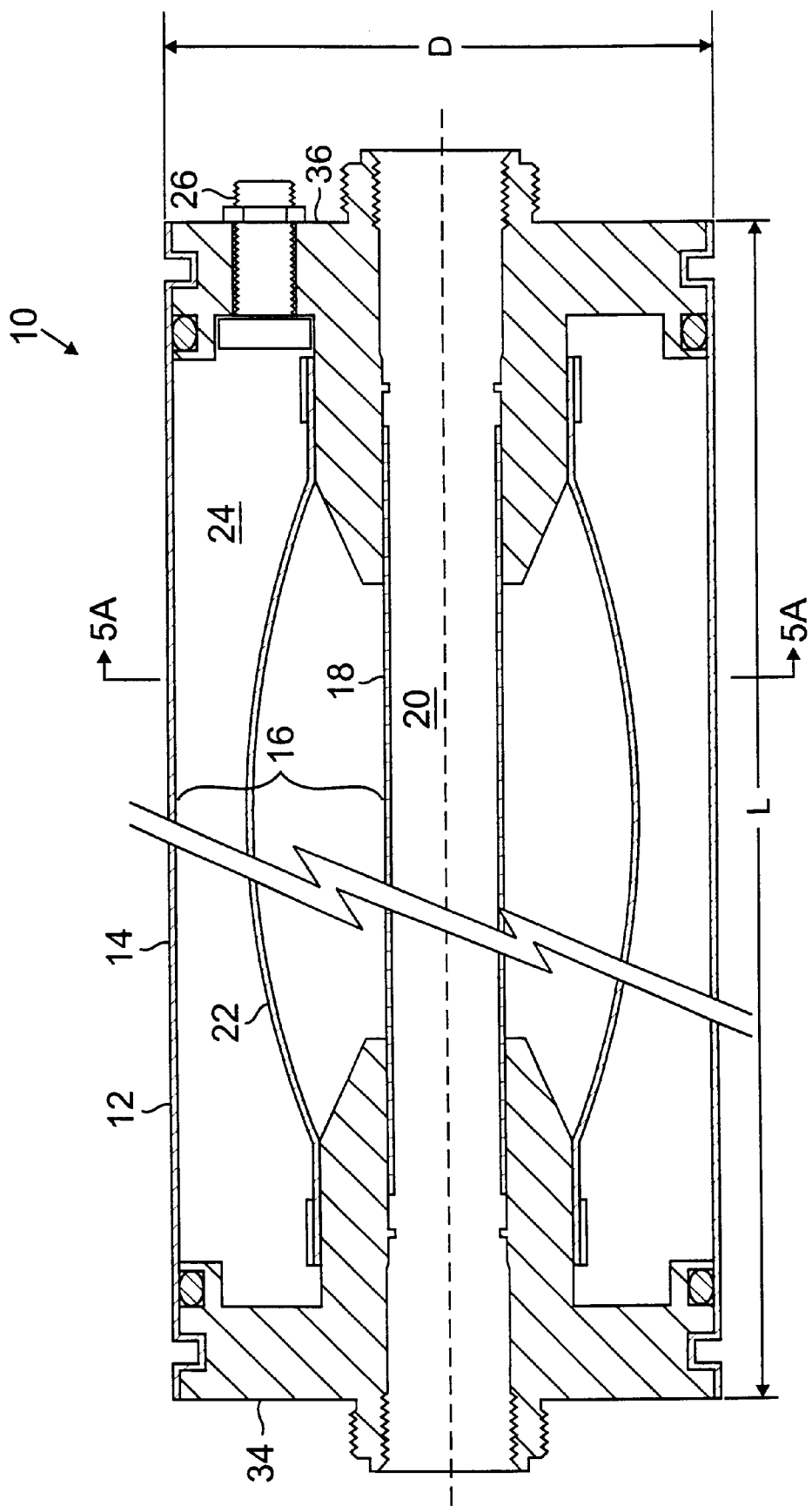
FIG. 5 is a cross-sectional side view of the inline expansion tank shown under conditions of thermal expansion of water in the system.

Referring to FIGS. 4 and 4A, in operation, the annular, sealed region 24 between sleeve 14 and bladder 22 is pressurized through valve 26, typically to the operating pressure of the piping system, e.g. 40 psi, pressing the bladder 22 elastically against pipe 18. Thus, in normal operation, there is substantially no dead space external to pipe 18 such that potential contamination, e.g., bacteria growth, which can occur from stagnant water is limited. Referring to FIGS. 5 and 5A, if pressure in the piping system rises, above the normal operating pressure, bladder 22 is expanded away from pipe 18, providing additional volume to reduce the pressure. When the pressure returns to the normal operating pressure or the piping system is opened, e.g. by opening a faucet, bladder 22 contracts to its original position about pipe 18, eliminating the extra volume between pipe 18 and bladder 22.

Pipe 18 and sleeve 14 are formed, e.g., from metal, pipe 18 being preferably copper, and sleeve 14 preferably carbon steel. Bladder 22 is formed, e.g., of a rubber such as butyl or any other material capable of deforming in shape under applied pressure to assume the configurations of FIGS. 4 and 5. Clamps 62 are formed, e.g., from stainless steel, and end caps 34, 36 are formed, e.g., from plastic. Sleeve 14 has a thickness, e.g., of about 0.065 inches, pipe 18 has a thickness, e.g., of about 0.024 inches, and bladder 22 has a thickness, e.g., of about 0.05 to 0.1 inches.

Other embodiments are within the scope of the following claims.

What is claimed is:

1. An in-line expansion tank, comprising:
    a sleeve defining a volume,
    a pipe positioned within the sleeve, the pipe having an inner surface defining a fluid flow channel, an inlet at an upstream region of the pipe in fluid communication with the fluid flow channel, and an outlet at a downstream region of the pipe in fluid communication with the fluid flow channel,
    an annular flexible bladder disposed within the volume between the sleeve and the pipe, the bladder and the sleeve defining an outer radial chamber therebetween, and
    a secondary flow channel arranged outside of an end of the pipe for allowing fluid communication between the fluid flow channel and a region between the pipe and the bladder,
    wherein the bladder is configured to contact the pipe at normal operating pressure to minimize dead space between the bladder and the pipe.

2. The tank of claim 1 wherein the radial chamber is pressurized during normal use.

3. The tank of claim 1 further comprising a valve for pressurizing the chamber.

4. The tank of claim 1 further comprising a first end cap at the upstream region to which the sleeve and bladder are attached.

5. The tank of claim 4 further comprising a first clamp for attaching the bladder to the first end cap, and a second clamp for attaching the bladder to the second end cap.

6. The tank of claim 4 further comprising a first o-ring seal positioned between the sleeve and the first end cap, and a second o-ring seal positioned between the sleeve and the second end cap.

7. The tank of claim 4 wherein the first and second end caps each define an inwardly extending lip for retaining the pipe therebetween.

8. The tank of claim 4 further comprising a second end cap at the downstream region to which the sleeve and bladder are attached.

9. The tank of claim 8 wherein the second end cap defines the secondary flow channel.

10. The tank of claim 4 wherein the first end cap defines the secondary flow channel.

11. The tank of claim 10 further comprising a second end cap at the downstream region to which the sleeve and bladder are attached, the second end cap defining a secondary flow channel arranged outside of an end of the pipe for allowing fluid communication between the fluid flow channel and a region between the pipe and the bladder.

12. The tank of claim 1 having an outer diameter of about four inches.

13. The tank of claim 1 having a length in the range of about 28 to 48 inches.

14. The tank of claim 1 wherein the pipe and sleeve are coaxial.

15. A method of accommodating changes in pressure in a piping system, comprising:
    coupling an inlet of an in-line expansion tank to a first piping system connection, and coupling an outlet of the expansion tank to a second piping system connection, the second piping system connection being in-line with the first connection, the tank including an outer sleeve, an inner pipe, and an annular, flexible bladder therebetween, and
    pressurizing a chamber defined between the outer sleeve and the baldder such that the bladder contacts the pipe at normal operating pressure to minimize dead space between the bladder and the pipe and expands radially away from the pipe when the pressure in the piping system rises above the normal operating pressure.

16. The method of claim 15 further comprising increasing the pressure in the piping system above the normal operating pressure to expand the flexible bladder away from the inner pipe.

17. The method of claim 16 wherein expanding the flexible bladder away from the pipe comprises introducing fluid from the fluid flow channel to a region between the pipe and the bladder through an end cap that defines a flow channel.

18. An in-line expansion tank, comprising:
    a sleeve defining a volume,
    a pipe positioned within the sleeve, the pipe having an inner surface defining a fluid flow channel, an inlet at an upstream region of the pipe in fluid communication with the fluid flow channel, and an outlet at a downstream region of the pipe in fluid communication with the fluid flow channel,
    an annular flexible bladder disposed within the volume between the sleeve and the pipe, the bladder and the sleeve defining an outer radial chamber therebetween,
    a first end cap at the upstream region to which the sleeve and bladder are attached, and
    a second end cap at the downstream region to which the sleeve and bladder are attached,
    wherein the first and second end caps each define a primary flow channel for introduction of fluid to the fluid flow channel, at least one of the first and second end caps further defining a secondary flow channel for allowing fluid communication between the fluid flow channel and a region between the pipe and the bladder.

19. An in-line expansion tank, comprising:

a sleeve defining a volume, a free-floating pipe moveable within the sleeve, the pipe having an inner surface defining a fluid flow channel, an inlet at an upstream region of the pipe in fluid communication with the fluid flow channel, and an outlet at a downstream region of the pipe in fluid communication with the fluid flow channel, and an annular flexible bladder disposed within the volume between the sleeve and the pipe, the bladder and the sleeve defining an outer radial chamber therebetween.

20. The tank of claim 19 further comprising a first end cap at the upstream region to which the sleeve and bladder are attached, and a second end cap at the downstream region to which the sleeve and bladder are attached.

21. The tank of claim 20 wherein the first and second end caps each define an inwardly extending lip for retaining the free-floating pipe therebetween.

22. The tank of claim 19 wherein the radial chamber is pressurized during normal use, the bladder being configured to contact the pipe at normal operating pressure to minimize dead space between the bladder and the pipe.

23. The tank of claim 19, further comprising a valve for pressurizing the chamber.

24. A method of accommodating changes in pressure in a piping system, comprising:

coupling an inlet of an in-line expansion tank to a first piping system connection, and coupling an outlet of the expansion tank to a second piping system connection, the second piping system connection being in-line with the first connection, the tank including an outer sleeve, free-floating inner pipe, and an annular, flexible bladder therebetween, and pressurizing a chamber defined between the outer sleeve and the bladder such that the bladder deforms toward the pipe at normal operating pressure and expands radially away from the pipe when the pressure in the piping system rises above the normal operating pressure.

25. The method of claim 24 further comprising increasing the pressure in the piping system above the normal operating pressure to expand the flexible bladder away from the inner pipe.

26. The method of claim 25 wherein expanding the flexible bladder away from the pipe comprises introducing fluid from the fluid flow channel to a region between the pipe and the bladder through an end cap that defines a flow channel.

27. An in-line expansion tank, comprising:

a sleeve defining a volume, a solid-walled pipe positioned within the sleeve, the pipe having an inner surface defining a fluid flow channel, an inlet at an upstream region of the pipe in fluid communication with the fluid flow channel, and an outlet at a downstream region of the pipe in fluid communication with the fluid flow channel, and an annular flexible bladder disposed within the volume between the sleeve and the pipe, the bladder and the sleeve defining an outer radial chamber therebetween.

28. The tank of claim 27 wherein the radial chamber is pressurized during normal use.

29. The tank of claim 27 further comprising a valve for pressurizing the chamber.

30. The tank of claim 27 further comprising a first end cap at the upstream region to which the sleeve and bladder are attached, and a second end cap at the downstream region to which the sleeve and bladder are attached.

31. The tank of claim 30 further comprising a first clamp for attaching the bladder to the first end cap, and a second clamp for attaching the bladder to the second end cap.

32. The tank of claim 30 further comprising a first o-ring seal positioned between the sleeve and the first end cap, and a second o-ring seal positioned between the sleeve and the second end cap.

33. The tank of claim 30 wherein the first and second end caps each define an inwardly extending lip for retaining the pipe therebetween.

34. The tank of claim 30 wherein the first and second end caps each define flow channels for allowing fluid communication between the fluid flow channel and a region between the pipe and the bladder.

35. The tank of claim 27 having an outer diameter of about four inches.

36. The tank of claim 27 having a length in the range of about 28 to 48 inches.

37. The tank of claim 27 wherein the pipe and sleeve are coaxial.

38. A method, comprising:

coupling an inlet of an in-line expansion tank to a first piping system connection, and coupling an outlet of the expansion tank to a second piping system connection, the second piping system connection being in-line with the first connection, the tank including an outer sleeve, an inner pipe having an inner surface defining a fluid flow channel, and an annular, flexible bladder therebetween, and providing fluid communication between the fluid flow channel and a region defined between the inner pipe and the bladder at an upstream region of the inner pipe and at a downstream region of the inner pipe through a first channel defined between a first end cap and an outer surface of the inner pipe, and through a second channel defined between a second end cap and the outer surface of the inner pipe.

39. A method of accommodating changes in pressure in a closed, hot water system, comprising:

coupling an inlet of an in-line expansion tank to a first piping connection in the hot water system, and coupling an outlet of the expansion tank to a second piping connection in the hot water system, the second piping connection being in-line with the first connection, the tank including an outer sleeve, an inner pipe, and an annular, flexible bladder therebetween, and pressurizing a chamber defined between the outer sleeve and the bladder such that the bladder deforms toward the pipe at normal operating water pressure and expands radially away from the pipe when the pressure in the piping system rises above the normal operating water pressure.

* * * * *